US012647718B2

(12) United States Patent
Jacquet et al.

(10) Patent No.: US 12,647,718 B2

(45) Date of Patent: Jun. 2, 2026

(54) METHOD FOR EQUALIZING AN AUDIO FREQUENCY SIGNAL BROADCAST IN A BROADCASTING ENVIRONMENT, COMPUTER PROGRAM PRODUCT AND CORRESPONDING DEVICE

(71) Applicant: ARKAMYS, Levallois-Perret (FR)

(72) Inventors: Damien Jacquet, Nantes (FR); Thomas Esnault, Paris (FR); Moulay Fadili, Cergy (FR)

(73) Assignee: ARKAMYS, Levallois-Perret (FR)

( * ) Notice: Subject to any disclaimer, the term of this patent is extended or adjusted under 35 U.S.C. 154(b) by 281 days.

(21) Appl. No.: 18/507,654

(22) Filed: Nov. 13, 2023

(65) Prior Publication Data

US 2024/0163601 A1 May 16, 2024

(30) Foreign Application Priority Data

Nov. 16, 2022 (FR) ........................................ 2211921

(51) Int. Cl.

*H04R 1/22* (2006.01)
*H04H 20/12* (2008.01)
*H04H 20/95* (2008.01)

(52) U.S. Cl.

CPC ............... *H04R 1/22* (2013.01); *H04H 20/12* (2013.01); *H04H 20/95* (2013.01)

(58) Field of Classification Search

CPC ........ H04R 1/22; H04R 3/04; H04R 2499/13; H03G 5/165; H03G 3/32; H04H 20/12; H04H 20/95; G10L 21/0232; G10K 11/175; G10K 11/1752; G10K 11/1754

See application file for complete search history.

(56) References Cited

U.S. PATENT DOCUMENTS

| | | | | |
|---|---|---|---|---|
| 8,964,998 B1 * | 2/2015 | McClain | H03G 3/32 | 381/106 |
| 2004/0264705 A1 * | 12/2004 | Hiipakka | H04M 1/6016 | 381/71.1 |
| 2005/0195988 A1 * | 9/2005 | Tashev | H04R 3/005 | 381/92 |

(Continued)

OTHER PUBLICATIONS

French Search Report for application No. FR2211921 dated Jun. 5, 2023.

*Primary Examiner* — Jason R Kurr

(74) *Attorney, Agent, or Firm* — Perman & Green LLP

(57) ABSTRACT

A method for equalizing an audio frequency signal broadcast in a broadcasting environment. Such a method includes: estimating a frequency profile of a noise signal representing a background noise present in the broadcasting environment, based on, on the one hand, a signal captured by at least one microphone implemented in the broadcasting environment and, on the other hand, the audio frequency signal; determining a desired frequency profile for the broadcast audio frequency signal; determining an acoustic frequency mask representing, for each frequency component, a difference between the frequency profile of the noise signal and the desired frequency profile; and equalizing the audio frequency signal via a weighting of a spectrum of the audio frequency signal by applying a frequency weighting mask that is a function of the acoustic frequency mask, delivering the equalized audio frequency signal.

14 Claims, 4 Drawing Sheets

(56) References Cited

U.S. PATENT DOCUMENTS

| | | | | |
|---|---|---|---|---|
| 2005/0207583 | A1 | 9/2005 | Christoph | |
| 2008/0031471 | A1* | 2/2008 | Haulick | H03G 5/16 381/86 |
| 2016/0295325 | A1* | 10/2016 | Enenkl | H03G 3/32 |
| 2022/0406326 | A1* | 12/2022 | Port | G06F 3/165 |

* cited by examiner

[Fig.1]
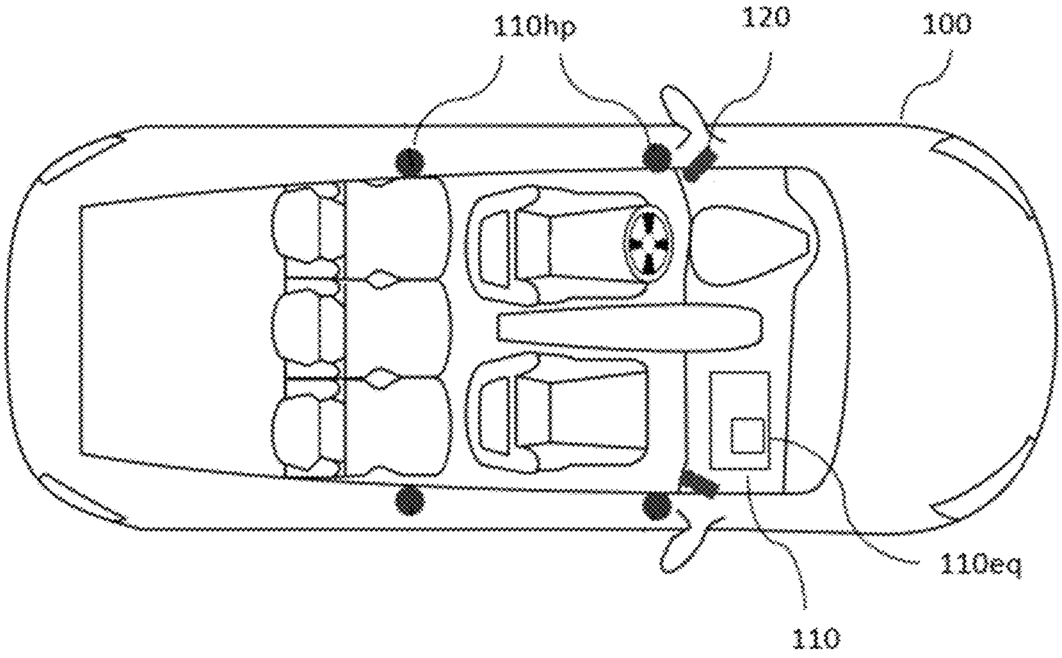
[Fig.2a]
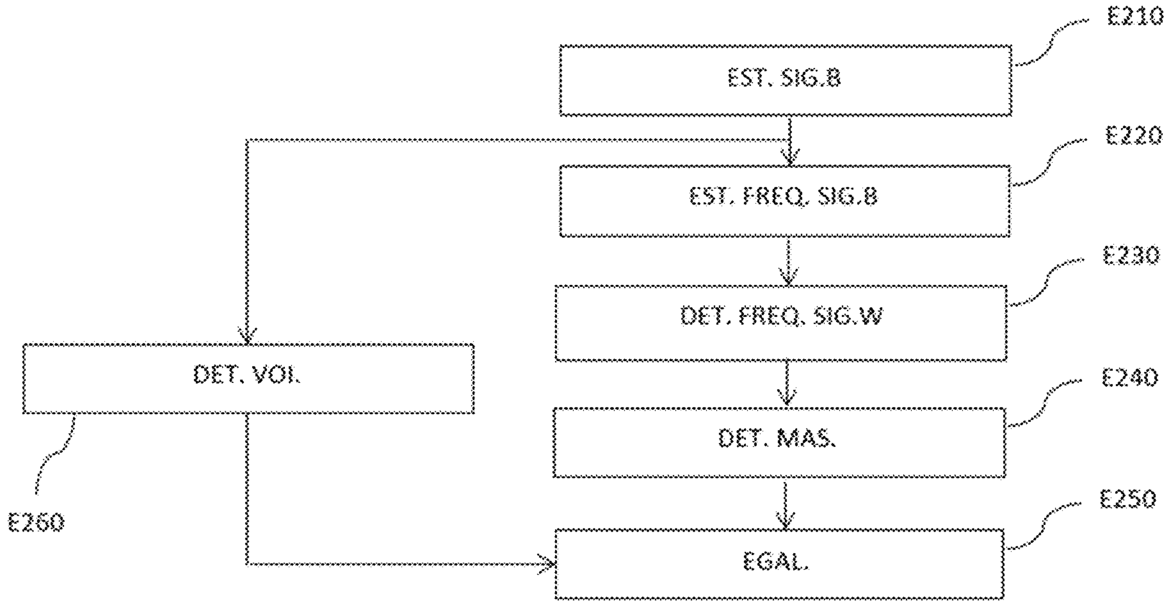

[Fig.2b]
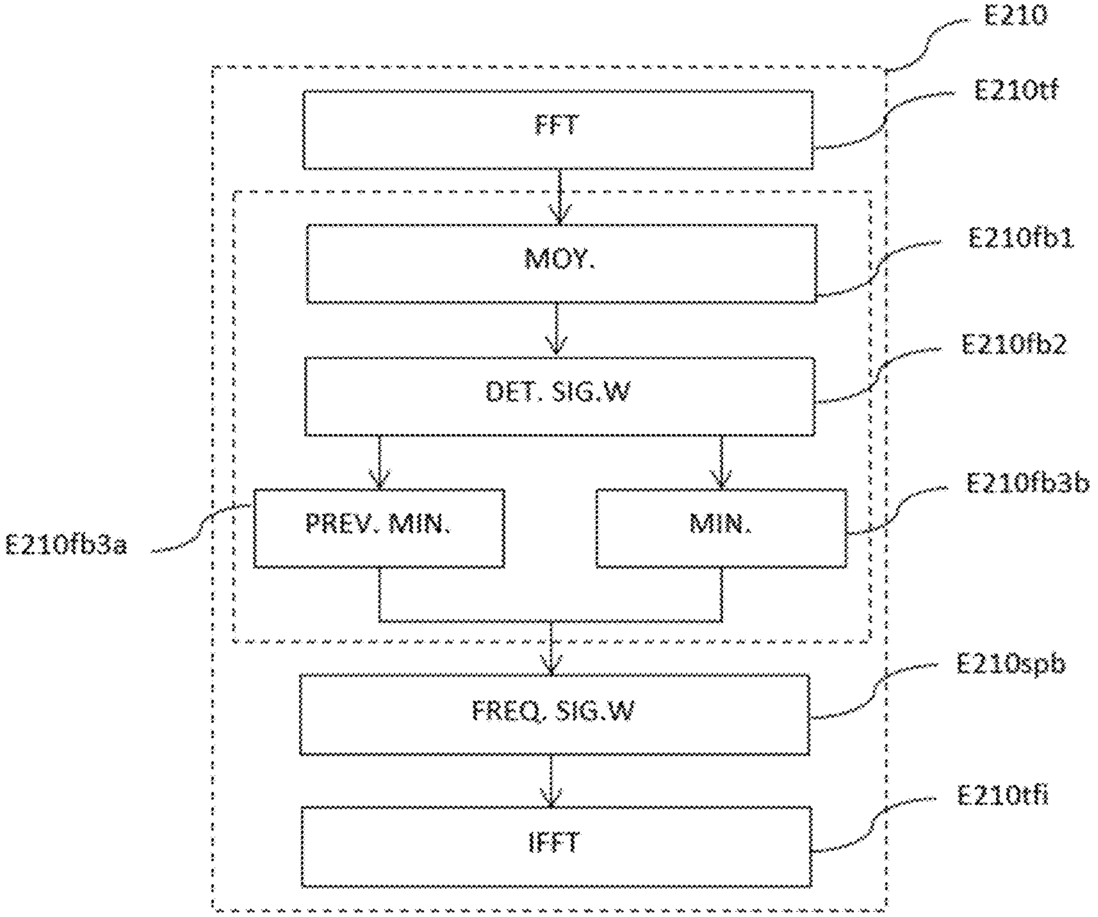
[Fig.2c]
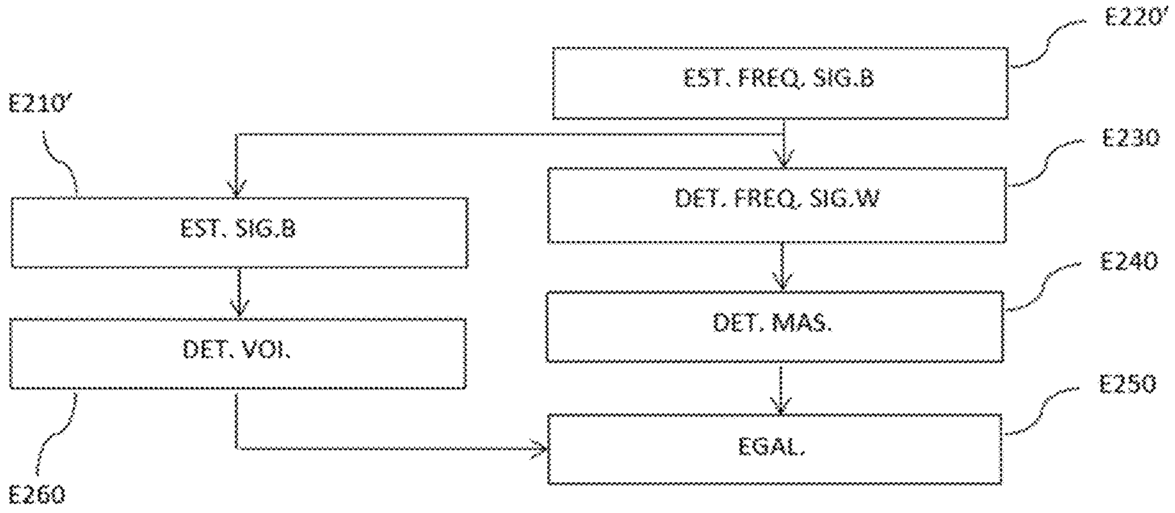

[Fig.3a]
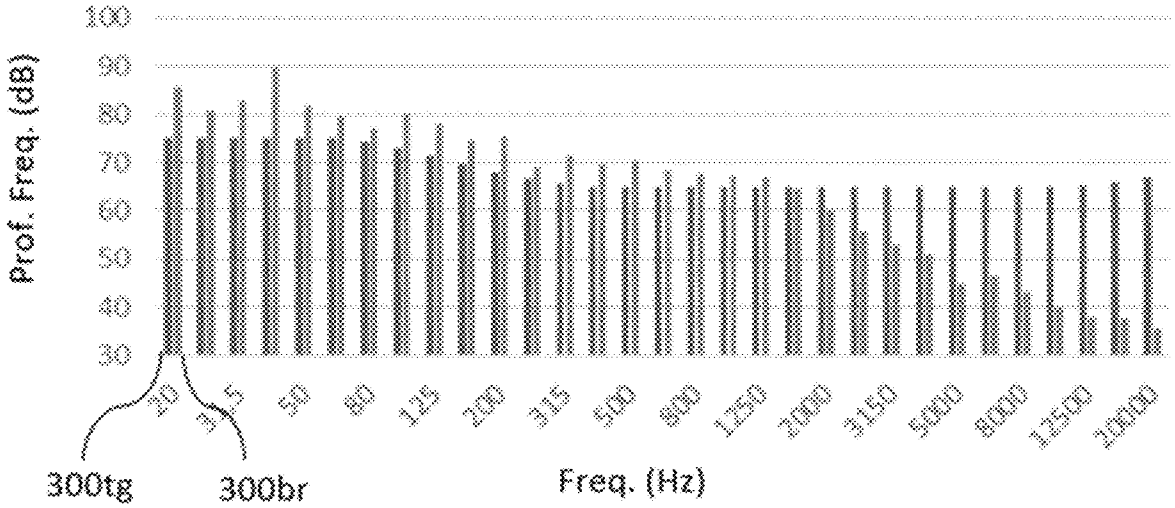
[Fig.3b]
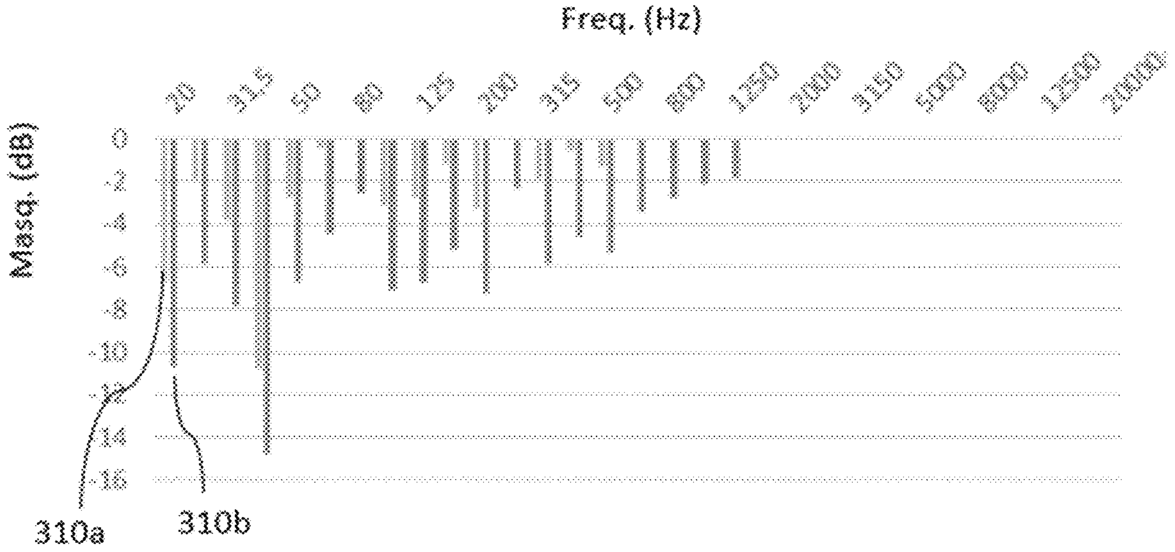

[Fig.4]
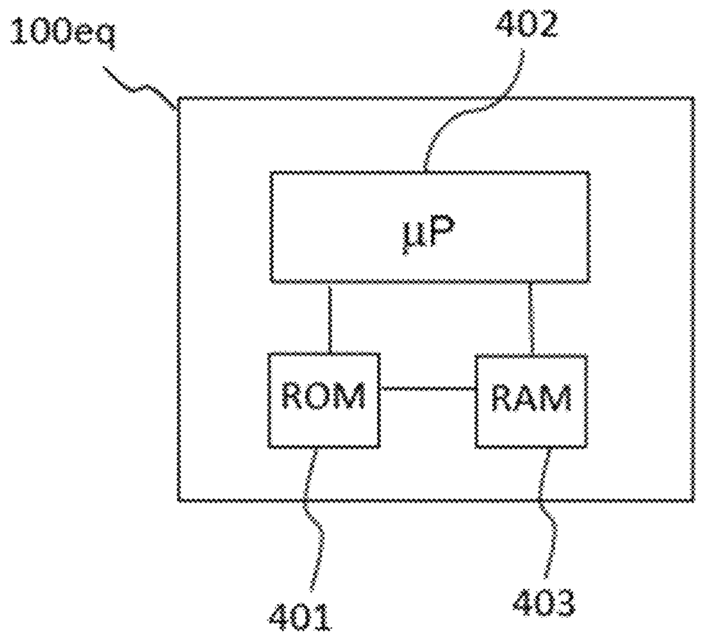

METHOD FOR EQUALIZING AN AUDIO FREQUENCY SIGNAL BROADCAST IN A BROADCASTING ENVIRONMENT, COMPUTER PROGRAM PRODUCT AND CORRESPONDING DEVICE

CROSS-REFERENCE TO RELATED APPLICATIONS

This application is based on and claims priority under 35 U.S.C. § 119 to French Patent Application No. FR2211921, filed on Nov. 16, 2022, in the French Intellectual Property Office, the disclosure of which is incorporated by reference herein in its entirety.

BACKGROUND

Field

The field of the disclosure is that of processing audio frequency signals.

The disclosure relates more specifically to a method for equalizing such a signal in a potentially noisy environment, in particular when the noise in question is likely to vary over time.

The disclosure has many applications, in particular, but not exclusively, for broadcasting an audio frequency signal in any type of broadcasting environment, e.g. a sports stadium, a theatre, the interior of a car or equivalent, etc.

Brief Description of Related Developments

In the remainder of this document, we will focus in particular on describing a problem in the field of broadcasting an audio frequency signal in a car's interior, which the inventors of the present patent application have faced. Of course, the disclosure is not limited to this particular field of application, but rather is of interest for broadcasting audio frequency signals in any type of broadcasting environment (e.g. a sports stadium, a theatre, etc.), in particular when the environment is noisy and the noise in question is likely to vary over time.

The effect of masking a first audio frequency signal by a second audio frequency signal is the process by which the hearing threshold for the first signal is raised by the presence of the second signal. In other words, spectrum masking occurs in a given frequency band when the presence of the second signal prevents detection of the first, lower amplitude signal in the same frequency band.

In a car, this effect is generally produced by the aerodynamic noise associated with the car's movement, as well as by the sound of the engine. If there is noise, the perception of the spectral balance of the music played in the car's interior can then be altered as certain frequencies will be masked.

The perceived tonal balance depends on the difference between the broadcast sound level and the masking threshold. As musical signals have a given dynamic range (difference between the highest and lowest amplitudes), for a given average level value in dB SPL (Sound Pressure Level) close to the threshold, certain components of the signal will be perceived and others will be masked.

To avoid the masking effect and preserve the perceived tonal balance, it is necessary to increase certain frequencies of the broadcast audio frequency signal above the masking threshold. In the prior art, two types of techniques are conventionally used to deal with this issue of masking:

- a technique known as SDVC (Speed Dependent Volume Control), which consists of adding a gain calculated from a speed table to increase the sound volume of the audio frequency signal (i.e. the entire audio frequency signal) above the masking threshold; and
- a technique known as SDEC (Speed Dependent Equalization Control), which involves applying a low shelf filter whose parameters depend on the speed and overall attenuation of the system.

However, the background noise in a car has various sources, including by way of example:

- the configuration of the car itself: e.g. sound insulation, aerodynamic shape, tyre type, engine, etc.;
- certain vehicle features that may modify the background noise: e.g. HVAC (Heating, Ventilation and Air-conditioning) system, activating/deactivating the combustion engine in hybrid cars, etc.;
- the car's speed: e.g. the driving noises and the aerodynamic noises increase with speed;
- the type of road surface: e.g. coarse-grained tarmac roads are noisier than smooth tarmac roads; and
- the environment: e.g. open country roads are quieter than tunnels. Rain and wind also increase the background noise in the vehicle.

Background noise can generally be described as broadband noise with a decay of 6 dB per octave in the high frequencies. However, depending on the sources of noise listed above, this definition may not be sufficient to describe the masking effects encountered in practice. For example, the high frequencies may also be masked when it rains. Similarly, depending on the type of vehicle and its speed, the frequency bands actually masked may change over time.

Faced with such variable masking effects, it can be noted that:

- The SDVC function increases the overall signal level as the speed increases. However, the perception of the broadcast audio frequency signal is not linear around the masking threshold (for example, the high frequencies may be better perceived than the low frequencies). Thus, as the speed increases, the SDVC function increases the overall signal level even though this is not necessarily required for all frequencies.
- The SDEC function introduces some spectral processing to avoid the above effect. By amplifying the signal with a low shelf filter, the SDEC function ensures that for a conventional noise profile (i.e. with a decay of 6 dB per octave in the high frequencies), the low frequencies are increased above the masking threshold and the perceived spectral balance is preserved. However, the hypothesis here is that the background noise profile only depends on the vehicle's speed. However, as described above, such a profile can change dramatically and unpredictably, e.g. with the road surface or environment.

A technique is therefore needed for equalizing an audio frequency signal broadcast in an environment having a background noise, the characteristics of which (in intensity and/or spectral shape) vary over time, as may be the case, for example, in a car.

SUMMARY

In one aspect of the disclosure, a method is proposed for equalizing an audio frequency signal broadcast in a broadcasting environment by a broadcasting system comprising at least one loudspeaker. Such a method comprises:

estimating a frequency profile of a noise signal representing a background noise present in the broadcasting environment, based on, on the one hand, a signal, called the captured signal, captured by at least one microphone implemented in the broadcasting environment and, on the other hand, said audio frequency signal;

determining a desired frequency profile for the broadcast audio frequency signal;

determining an acoustic frequency mask representing, for each frequency component, a difference between the frequency profile of the noise signal and the desired frequency profile; and equalizing the audio frequency signal via a weighting of a spectrum of the audio frequency signal by applying a frequency weighting mask that is a function of the acoustic frequency mask, delivering the equalized audio frequency signal.

The disclosure thus proposes a novel and innovative solution for equalizing an audio frequency signal broadcast in a broadcasting environment.

More specifically, the fact that the actual noise present in the broadcasting environment (e.g. a vehicle, a sports stadium, a room in a building, a theatre, etc.) is taken into account via the microphone(s) enables the equalization to be adapted to all types of noise that may be present in such a broadcasting environment (e.g. for a vehicle: aerodynamic driving noise, engine noise, tyre contact noise on the road in the case of a car, etc.) as well as their evolution over time.

Furthermore, equalization by weighting the spectrum of the audio frequency signal provides more precise equalization than using a conventional shelf-type filter.

In some aspects, the acoustic frequency mask represents, for each frequency component, said difference when said difference is greater than a predetermined threshold.

In other words, the audio frequency signal, for a given frequency component, is considered to be masked if the energy of the background noise exceeds the target value for the audio frequency signal by an amount at least equal to the predetermined threshold. The threshold can therefore be seen as an offset applied to the acoustic mask. Such a threshold allows the dynamics of the audio frequency signal to be taken into account and preserved.

In some aspects, the frequency weighting mask is obtained by weighting different frequency components of the acoustic frequency mask by applying predetermined weighting values.

In this way, high-frequency harshness or sibilance can be controlled. This weighting control also allows the lack of precision in noise extraction to be taken into account perceptually by adjusting it by ear in operational conditions for a given type of broadcasting environment.

In some aspects, the values of the frequency weighting mask are limited to a maximum value and a minimum value.

In this way, the maximum value defines a maximum weighting of the spectrum of the audio frequency signal, avoiding any discrepancy in determining the correction and limiting the overall gain. Excessive gain could overly modify the target audio perception (via the "loudness" effect) of the audio frequency signal.

Similarly, the minimum value, e.g. corresponding to a weighting of 0 dB, allows the dynamic range of the audio frequency signal not to be reduced (or to be reduced only to a limited extent).

In some aspects, the determination of a desired frequency profile involves calculating a desired frequency division of an energy of the audio frequency signal as a function of at least one parameter belonging to the group comprising:

a sound volume for broadcasting the audio frequency signal. For example, if the broadcasting environment is the inside of a vehicle, such a sound volume for broadcasting the audio frequency signal may be variable or not as a function of the speed at which the vehicle is travelling;

an intensity, variable in frequency, depending on the sound volume;

predefined frequency equalization;

one or more parameters for configuring said broadcasting system; and when said broadcasting system comprises a plurality of loudspeakers, one or more parameters for distributing said audio frequency signal between said loudspeakers.

In this way, the desired frequency profile for the audio frequency signal in the broadcasting environment is obtained, for example at a given listening point.

In some aspects, said estimation of a frequency profile of the noise signal involves correcting a transfer function of said at least one microphone.

In this way, the noise signal capture errors caused by the microphone(s) are compensated for.

In some aspects, the method comprises:

estimating the noise signal; and detecting at least one voice signal present in the noise signal providing detection information.

The steps of estimating, determining and equalizing are carried out periodically for various samples of the captured signal and the audio frequency signal. The frequency equalization implements, for a given implementation:

when said detection information represents an absence of detection of at least one voice signal in the noise signal: the frequency weighting mask corresponding to the acoustic frequency mask determined during the given implementation of said steps; or when said detection information represents the detection of at least one voice signal in the noise signal: the frequency weighting mask corresponding to the acoustic frequency mask determined during a previous implementation of said steps.

In this way, the correction parameters are frozen when voice signals not initially present in the audio frequency signal are detected in the signal captured by the microphone(s) (e.g. for a vehicle: the voice of the passengers in the vehicle). This avoids discrepancies or artefacts in the equalization.

In some aspects, the method comprises:

estimating the noise signal; and detecting at least one voice signal present in the noise signal providing detection information.

The steps of estimating, determining and equalizing are carried out periodically for various samples of the captured signal and the audio frequency signal. Detection of at least one voice signal involves estimating a likelihood of the presence of at least one voice signal in the noise signal. The frequency equalization implements, for a given implementation, the frequency weighting mask corresponding to a weighted linear combination of, on the one hand, the acoustic frequency mask determined during a previous implementation of said steps and, on the other hand, the acoustic frequency mask determined during the given implementation of said steps. The weighting is a function of the likelihood of presence such that the linear combination is reduced to:

the acoustic frequency mask determined during a previous implementation of said steps when the likelihood of the presence of at least one voice signal in said noise signal is equal to 1; and the acoustic frequency mask determined during the given implementation of said steps when the likelihood of the presence of at least one voice signal in said noise signal is zero.

In some aspects, the weighted linear combination is expressed as Pvp(f)=P0(f)+α(p)·(Pm(f)−P0(f)), where:

P0(f) is the acoustic frequency mask determined during a previous implementation of the steps of estimating, determining and equalizing;

Pm(f) is the acoustic frequency mask determined during the given implementation of the abovementioned steps; and α(p)=1-p is said weighting as a function of said likelihood of presence, with p said likelihood of presence.

In some aspects, the frequency equalization implements temporal smoothing of the frequency weighing mask according to the law Pvp_m(n,f)=P(n)·(Pvp(f)−Pvp_m(n−1, f)), where:

Pvp_m(n,f) is the frequency weighting mask smoothed over time for a frequency f of the signal band to be equalized during the nth implementation of the steps of estimating, determining and equalizing;

Pvp(f) is the frequency weighting mask calculated during the nth implementation of said steps;

Pvp_m(n−1,f) is the smoothed frequency weighting mask for a frequency f of the signal band to be equalized during the (n−1)th implementation of said steps; and β(n) is a weighting factor comprised between 0 and 1.

In some aspects, the estimation of the noise signal involves a method of spectral estimation of background noise, based on, on the one hand, the captured signal and, on the other hand, the audio frequency signal. The estimation of the frequency profile of the noise signal comprises:

applying a filter bank to the noise signal providing a plurality of filtered noise signals, envelope detection of each of the filtered noise signals providing a corresponding plurality of filtered noise signal envelopes, low-pass filtering of each of the filtered noise signal envelopes providing a corresponding plurality of components of the frequency profile of the noise signal.

In some aspects, the estimation of the frequency profile of the noise signal comprises:

applying a filter bank to the captured signal providing a plurality of filtered captured signals, for each of the filtered captured signals: implementing a method of spectral estimation of background noise, based on, on the one hand, the filtered captured signal and, on the other hand, the audio frequency signal providing a corresponding plurality of filtered noise signals, envelope detection of each of the filtered noise signals providing a corresponding plurality of filtered noise signal envelopes, low-pass filtering of each of the filtered noise signal envelopes providing a corresponding plurality of components of the frequency profile of the noise signal.

The estimation of the noise signal involves a summation of each of the filtered noise signals.

For example, the method of spectral estimation of background noise in question is a method of spectral estimation of background noise as implemented in methods for reducing noise by echo cancellation, known as ECNR, such as encountered, for example, in the mobile phone sector.

In some aspects, the method comprises an averaging of a plurality of signals each captured by a different microphone implemented in the broadcasting environment. The averaging provides the captured signal.

The disclosure also relates to a computer program comprising program code instructions for implementing a method as described above, according to one of its various aspects, when it is run on a computer.

The disclosure also relates to a device for equalizing an audio frequency signal broadcast in a broadcasting environment by a broadcasting system comprising at least one loudspeaker. Such an equalization device comprises a reprogrammable computing machine or a dedicated computing machine configured to carry out the steps of the equalization method according to the disclosure (according to one of the various aforementioned aspects). The features and advantages of this device are thus the same as those of the corresponding steps of the equalization method described above. As such, they are not described in more detail.

BRIEF DESCRIPTION OF FIGURES

Other aims, features and advantages of the disclosure will become more apparent upon reading the following description, provided simply by way of non-limiting example, with reference to the figures, wherein:

FIG. 1 shows a system for broadcasting an audio frequency signal implemented in a vehicle according to one aspect of the disclosure;

FIG. 2*a* shows the steps of a method for equalizing the audio frequency signal broadcast by the broadcasting system of [FIG. 1] according to one aspect of the disclosure;

FIG. 2*b* shows the steps of the step for estimating the noise signal of the method of [FIG. 2*a*] according to one aspect of the disclosure;

FIG. 2*c* shows the steps of the method for equalizing the audio frequency signal broadcast by the broadcasting system of [FIG. 1] according to another aspect of the disclosure;

FIG. 3*a* shows a frequency profile of the noise signal as well as a desired frequency profile for the broadcast audio frequency signal as obtained by applying the equalization method according to the disclosure;

FIG. 3*b* shows an acoustic frequency mask representing, for each frequency component, a difference between the frequency profile of the noise signal and the desired frequency profile as obtained by applying the equalization method according to the disclosure;

FIG. 4 shows an exemplary device structure enabling all or some of the steps of the equalization method according to the disclosure according to one aspect of the disclosure to be carried out.

DETAILED DESCRIPTION

The general principle of the disclosure is based on estimating a frequency profile of a signal representing a background noise present in a broadcasting environment based on, on the one hand, a signal captured by one (or more) microphone(s) implemented in the broadcasting environment and, on the other hand, an audio frequency signal broadcast in the broadcasting environment in question. An acoustic frequency mask representing, for each frequency component, a difference between the frequency profile of the noise signal and the desired frequency profile for the broadcast audio frequency signal (e.g. when the frequency profiles in question are expressed in logarithmic units) is determined. The audio frequency signal is equalized via a weighting of its spectrum by applying a frequency weighting mask that is a function of the frequency acoustic mask.

Thus, the fact that the actual noise present in the broadcasting environment is taken into account via the microphone(s) enables the equalization to be adapted to all types of noise that may be present in such a broadcasting environment (e.g. for a vehicle: aerodynamic driving noise, engine noise, tyre contact noise on the road in the case of a car, etc.) as well as their evolution over time.

Furthermore, equalization by weighting the spectrum of the audio frequency signal provides more precise equalization than using a conventional shelf-type filter.

With reference to [FIG. 1], a system for broadcasting 110 an audio frequency signal implemented in a broadcasting environment which takes the form of a vehicle 100 according to one aspect of the disclosure is now shown.

The vehicle is shown here in the form of a car, but the method according to the disclosure applies likewise to all types of vehicles.

Returning to [FIG. 1], the broadcasting system 110 comprises a plurality of loudspeakers 110*hp* as well as an equalization device 110*eq* according to the disclosure. Such an equalization device 110*eq* is designed to implement the equalization method according to one of the aspects described below with reference to [FIG. 2*a*], [FIG. 2*b*] or [FIG. 2*c*]. Furthermore, examples of means used in the equalization device 110*eq* are detailed below with reference to [FIG. 4].

In certain aspects, the equalization device 110*eq* is not part of the broadcasting system 110, but rather is connected to the broadcasting system 110 via a wire connection (e.g. USB connection or equivalent) or radio connection (e.g. Bluetooth, Wi-Fi or equivalent) in order to exchange data, e.g. the broadcast audio frequency signal and the equalized audio frequency signal.

In certain aspects, the broadcasting system 110 comprises a single loudspeaker 110*hp*.

Returning to [FIG. 1], the vehicle 100 is fitted with microphones 120 that can capture a signal in the vehicle 100. More specifically, the captured signal comprises both the background noise of the vehicle (e.g. the aerodynamic driving noise), the audio frequency signal as broadcast by the loudspeakers 110*hp* and, if applicable, the voice of the occupant(s) of the vehicle.

In certain aspects, a single microphone 120 is used to capture the signal in the vehicle 100.

With reference to [FIG. 2*a*], we will now show the steps of a method for equalizing the audio frequency signal broadcast in the vehicle 100 according to one aspect of the disclosure.

Examples of the implementation of the steps of the equalization method in question are also discussed with reference to [FIG. 3*a*] and [FIG. 3*b*]. Furthermore, [FIG. 2*b*] shows the steps of the step for estimating the noise signal of the method of [FIG. 2*a*] according to one particular aspect.

Returning to [FIG. 2*a*], during a step E210, the equalization device 110*eq* estimates a noise signal representing the background noise present in the vehicle 100, based on, on the one hand, a signal, called the captured signal, captured by the microphones 120 and, on the other hand, the audio frequency signal broadcast by the broadcasting system 110. The audio frequency signal is, for example, supplied to the equalization device 110*eq* by the broadcasting system 110.

For example, the captured signal corresponds to an averaging of signals each captured by one of the microphones 120. In this way, the background noise present throughout the vehicle is estimated more accurately. In the aforementioned aspects in which a single microphone is used to capture the signal in the vehicle 100, the captured signal corresponds to the signal captured by the microphone in question.

Returning to [FIG. 2*a*], the noise signal is, for example, estimated by carrying out the steps shown in [FIG. 2*b*].

More specifically, during a step E210*tf*, a spectrogram of the captured signal is estimated, e.g. based on Fourier transforms of the captured signal. Such a spectrogram is, for example, estimated periodically. For example, an updated spectrogram is delivered with each new available sample of the captured signal.

Thus, for each of the frequency components of the spectrograms of the captured signal:

- during a step E210*fb*1, time averaging is applied, delivering an averaged frequency component;
- during a step E210*fb*2, detection of the audio frequency signal, e.g. as supplied to the equalization device 110*eq* by the broadcasting system 110, is performed in the averaged frequency component considered in a given time window. Detection information is supplied;
- if the detection information represents an absence of detection of the audio frequency signal in the averaged frequency component, a minimum value in the given time window is retained for the frequency component in question (step E210*fb*3*b*); or
- if the detection information represents the detection of the audio frequency signal in the averaged frequency component, the minimum value previously retained for the frequency component in question is retained again (step E210*fb*3*a*).

In this way, during a step E210*spb*, a spectrogram of the noise signal representing the background noise present in the vehicle 100 is estimated by concatenating the values of the frequency components retained during steps E210*fb*3*b* or E210*fb*3*a*.

During a step E210*tfi*, an inverse Fourier transform is applied to the spectrogram of the noise signal, producing the estimated noise signal.

In other aspects, other methods for estimating the noise signal are implemented. The noise signal is, for example, estimated by implementing a method of spectral estimation of background noise as implemented in methods for reducing noise by echo cancellation, known as ECNR (Echo Cancellation Noise Reduction). Such ECNR methods are, for example, conventionally used in the mobile phone sector.

Returning to [FIG. 2*a*], during a step E220, a frequency profile of the noise signal is estimated. For example, the estimation of the frequency profile of the noise signal comprises:

- applying a filter bank to the noise signal providing a plurality of filtered noise signals;
- envelope detection of each of the filtered noise signals providing a corresponding plurality of filtered noise signal envelopes; and
- low-pass filtering of each of the filtered noise signal envelopes providing a corresponding plurality of components of the frequency profile of the noise signal.

In certain aspects, the estimation of the frequency profile of the noise signal involves estimating a spectrogram of the noise signal, for example based on Fourier transforms.

In certain aspects, the estimation of the frequency profile of the noise signal involves correcting the transfer function(s) of the microphone(s) 120. In this way, the noise signal capture errors caused by the microphones are compensated for.

The bars 300*br* shown in [FIG. 3*a*] show such components of the frequency profile of the noise signal obtained by carrying out step E220.

Returning to [FIG. 2*a*], during a step E230, a desired frequency profile for the broadcast audio frequency signal is determined. More specifically, such a frequency profile represents the desired frequency profile for the audio frequency signal at the listening point. The determination of the desired frequency profile involves calculating a desired frequency division for the energy of the audio frequency signal, for example as a function of at least one parameter belonging to the group comprising:

- a sound volume for broadcasting the audio frequency signal that may or may not be variable as a function of the speed at which said vehicle is travelling;
- an intensity, variable in frequency, depending on the sound volume (e.g. frequency equalization depending on the sound volume);
- predefined frequency equalization, e.g. to achieve a tonal balance target (or frequency target);
- one or more parameters for configuring the broadcasting system 110 (e.g. parameters for tonality, sound environment, sound distribution, the setting of certain effects, or any other settings that have an influence on the target intensity and frequency response of the broadcasting system 110); and
- when the broadcasting system 110 comprises a plurality of loudspeakers 110*hp*, one or more parameters for distributing the audio frequency signal between the loudspeakers 110*hp*.

The diagram 300*tg* shown in [FIG. 3*a*] shows such components of the desired frequency profile for the broadcast audio frequency signal obtained by carrying out step E230.

Returning to [FIG. 2*a*], during a step E240, an acoustic frequency mask representing, for each frequency component, a difference between, on the one hand, a value of the frequency profile of the noise signal obtained during step E220 and, on the other hand, a value of the desired frequency profile obtained during step E230. In such a difference, the values of the frequency profiles are expressed in logarithmic units or natural units. Alternatively, the acoustic frequency mask can be obtained, for each frequency component, by dividing the frequency profile value of the noise signal by the value of the desired frequency profile when the frequency profiles are expressed as natural units. However, in this case, the acoustic frequency mask continues to represent the aforementioned difference.

In certain aspects, the acoustic frequency mask represents, for each frequency component, said difference when the difference in question is greater than a predetermined threshold. In other words, the audio frequency signal, for a given frequency component, is considered to be masked if the energy of the background noise exceeds the target value for the audio frequency signal by an amount at least equal to the predetermined threshold. The threshold can therefore be seen as an offset applied to the acoustic mask. Such a threshold allows the dynamics of the audio frequency signal to be taken into account and preserved. According to the implementations, such a threshold can have a default value and/or also be adapted over time as a function of e.g. a user setting in the vehicle, the strength of the noise signal, etc.

The bars 310*a* and 310*b* shown in [FIG. 3*b*] show such acoustic frequency masks obtained during step E240 for two different threshold values, i.e. for a threshold value of 4 dB and 0 dB respectively.

Returning to [FIG. 2*a*], during a step E250, the audio frequency signal is equalized via a weighting of its spectrum by applying a frequency weighting mask that is a function of the frequency acoustic mask. An equalized audio frequency signal is thus obtained.

For example, a filter bank is applied to the audio frequency signal providing a corresponding plurality of filtered audio frequency signals. Each filtered audio frequency signal is weighted by a component of the frequency weighting mask corresponding to the frequency band of the filtered audio frequency signal in question.

Thus, the fact that the actual noise present in the vehicle is taken into account via the microphone(s) enables the equalization to be adapted to all types of noise that may be present in such a vehicle (e.g. aerodynamic noise, engine noise, tyre contact noise on the road in the case of a travelling vehicle, etc.) as well as their evolution over time.

Furthermore, equalization by weighting the spectrum of the audio frequency signal provides more precise equalization than using a conventional shelf-type filter.

In certain aspects, the frequency weighting mask is obtained by weighting different frequency components of the acoustic frequency mask by applying predetermined weighting values.

In this way, high-frequency harshness or sibilance can be controlled. This weighting control also allows the lack of precision in noise extraction to be taken into account perceptually by adjusting it by ear in operational conditions for a given type of vehicle.

According to the implementations, such weighting values can have a default value and/or also be adapted over time as a function of e.g. a user setting in the vehicle, the strength of the noise signal, etc.

In certain aspects, the values of the frequency weighting mask are limited to a maximum value and a minimum value.

For example, the maximum value defines a maximum weighting of the spectrum of the audio frequency signal, avoiding any discrepancy in determining the correction and limiting the overall gain. Excessive gain could overly modify the target audio perception (via the "loudness" effect) of the audio frequency signal.

Similarly, the minimum value, e.g. corresponding to a weighting of 0 dB, allows the dynamic range of the audio frequency signal not to be reduced (or to be reduced only to a limited extent).

Returning to [FIG. 2*a*], during a step E260, detection takes place to see whether one (or more) voice signal(s) is/are present in the noise signal. Detection information is thus supplied. For example, such detection information can be binary, assuming two values representing logic states: detection of one (or more) voice signal(s) in the noise or non-detection of one (or more) voice signal(s) in the noise.

Indeed, in certain aspects, the aforementioned steps of estimating (E210, E220), determining (E230, E240) and equalizing (E250) are carried out periodically for various samples of the captured signal and the audio frequency signal. In this way, the frequency equalization implements, for a given implementation:

- when the detection information represents an absence of detection of one (or more) voice signal(s) in the noise signal: the frequency weighting mask corresponding to the acoustic frequency mask determined during the given implementation of the aforementioned steps; or when the detection information represents the detection of one (or more) voice signal(s) in the noise signal: the frequency weighting mask corresponding to the acoustic frequency mask determined during a previous implementation of said steps.

In this way, the correction parameters are frozen when voice signals not initially present in the audio frequency signal are detected in the signal captured by the microphone(s) (e.g. the voice of the occupant(s) of the vehicle). This avoids discrepancies or artefacts in the equalization.

In other aspects, the detection information provided during step E260 represents a likelihood rate of the presence of voice signals in the noise signal. In this case, the step E260 comprises, for example, estimating the likelihood of the presence of one (or more) voice signal(s) in the noise signal (e.g. the voice of one (or more) occupant(s) of the vehicle). To do this, a voice detection method, for example the G.729 VAD (Voice Activity Detection) technique, combined with the comparison between, on the one hand, the audio frequency signal sent to the loudspeakers 110*hp* and, on the other hand, the signal captured by the microphone(s) 120 is implemented, for example. Indeed, the VAD can detect the presence of one (or more) voice signal(s) in the noise signal. The comparison between the audio frequency signal and the captured signal is used to check whether the voice signal(s) that may have been detected by the VAD represent(s) the voice of one (or more) occupant(s) present in the audio frequency signal. ECNR techniques can be used for such a comparison, for example:

- comparison of the ratio of the energies of said audio frequency and captured signals to a predetermined threshold (method known as the Geigel algorithm); or
- correlation between said audio frequency and captured signals.

A likelihood p of the presence of one (or more) voice signal(s) in the noise signal is thus calculated as a function of the aforementioned correlation (e.g. P=f1(correlation)), or the aforementioned energy ratio (e.g. P=f2(signal energy ratio)). An example of the f1 function is: $f1(x)=x$. An example of the f2 function is: $f2(x)=x$ if $x<1$ and $f2(x)=1$ if $x>1$.

In such aspects of the step E260, the frequency weighting mask is weighted as a function of the likelihood of the presence of one (or more) voice signal(s) in the noise signal. For example, the weighting $\alpha$ takes the form: $\alpha(p)=1-p$.

In such aspects, the frequency weighting mask Pvp(f) is expressed, for example, as $Pvp(f)=P0(f)+\alpha(p)\cdot(Pm(f)-P0(f))$, where:

- P0(f) is the acoustic frequency mask determined during a previous implementation of the steps of estimating (E210, E220), determining (E230, E240) and equalizing (E250).
- Pm(f) is the acoustic frequency mask determined during the given implementation of the abovementioned steps.

In this way, the frequency weighting mask Pvp(f) is reduced to the acoustic frequency mask P0(f) determined during a previous implementation of the aforementioned steps when $\alpha(p)=0$, i.e. when the likelihood p of the presence of a voice signal in the noise signal is equal to 1. Similarly, the frequency weighting mask Pvp(f) is reduced to the acoustic frequency mask Pm(f) determined during the given implementation of the aforementioned steps when $\alpha(p)=1$, i.e. when the likelihood p of the presence of a voice signal in the noise signal is zero.

In certain aspects, other expressions are used for the weighting $\alpha(p)$ and for the frequency weighting mask Pvp (f). However, in such aspects, the frequency weighting mask Pvp(f) is reduced to the acoustic frequency mask P0(f) determined during a previous implementation of the aforementioned steps when the likelihood p of the presence of a voice signal in the noise signal is equal to 1. Similarly, the frequency weighting mask Pvp(f) is reduced to the acoustic frequency mask Pm(f) determined during the given implementation of the aforementioned steps when the likelihood p of the presence of a voice signal in the noise signal is zero.

In certain aspects, temporal smoothing (or time averaging) is applied to the acoustic frequency mask. Temporal smoothing follows the following law: $Pvp\_m(n,f)=P(n)\cdot(Pvp(f)-Pvp\_m(n-1,f))$ where:

- Pvp_m(n,f) is the frequency weighting mask smoothed over time for a frequency f of the signal band to be equalized during the nth implementation of the steps of estimating (E210, E220), determining (E230, E240) and equalizing (E250);
- Pvp(f) is the frequency weighting mask as calculated above;
- Pvp_m(n−1,f) is the smoothed frequency weighting mask for a frequency f of the signal band to be equalized during the (n−1)th implementation of said steps; and
- P(n) is the weighting factor (also called the tracking factor or forgetting factor) depending on n according to an attack (or discharge) time. The values of P(n) are comprised between 0 and 1 (i.e. $0<\beta(n)<1$).

In certain aspects, the detection of one (or more) voice signal(s) in the captured signal is carried out in a narrow band of the captured signal to reduce the calculations required for this detection. Sub-sampling is carried out to adapt said signal to the narrow band. Such a narrow band is limited, for example, to 0 . . . 4 kHz, which contains the most significant part of the voice's energy.

However, in certain aspects, the step E260 is not carried out and the correction parameters used for the equalization during step E250 are not frozen, but rather updated each time the steps of the method are carried out again.

With reference to [FIG. 2*c*], we will now show the steps of the method for equalizing the audio frequency signal broadcast in the vehicle 100 according to another aspect of the disclosure.

The aspect shown in [FIG. 2*c*] differs from the aspect shown in [FIG. 2*a*] in that the frequency profile of the noise signal is estimated without having to previously estimate the noise signal in the time domain.

More specifically, during step E220', the frequency profile of the noise signal is estimated by carrying out the following steps:

- applying a filter bank to the captured signal providing a plurality of filtered captured signals;
- for each of the filtered captured signals: implementing a method of spectral estimation of background noise, based on, on the one hand, the filtered captured signal and, on the other hand, the audio frequency signal providing a corresponding plurality of filtered noise signals;
- envelope detection of each of the filtered noise signals providing a corresponding plurality of filtered noise signal envelopes; and
- low-pass filtering of each of the filtered noise signal envelopes providing a corresponding plurality of components of the frequency profile of the noise signal.

For example, the method of spectral estimation of background noise in question is a method of spectral estimation of background noise as implemented in the aforementioned ECNR methods. Alternatively, the steps described above with reference to step E210 can be carried out instead of a method of spectral estimation of background noise as implemented in the ECNR methods in order to estimate each filtered noise signal.

Returning to [FIG. 2*c*], by carrying out steps E230, E240 and E250 as described above with reference to [FIG. 2*a*] and [FIG. 2*b*] (according to one of the aforementioned aspects), equalization of the broadcast audio frequency signal is achieved without having to estimate the noise signal as such.

Furthermore, according to the aspect shown in [FIG. 2*c*], the noise signal is estimated by summation of each of the filtered noise signals during step E210'.

In this way, by carrying out step E260 as described above with reference to [FIG. 2*a*] and [FIG. 2*b*](according to one of the aforementioned aspects), it can be detected whether one (or more) voice signal(s) is/are present in the noise signal. In this way, the correction parameters used for equalization during step E250 are frozen when voice signals not initially present in the audio frequency signal are detected in the signal captured by the microphone(s) (e.g. the voice of the passengers in the vehicle). This avoids discrepancies or artefacts in the equalization.

However, in certain aspects, the steps E210' and E260 are not carried out and the correction parameters used for the equalization during step E250 are not frozen, but rather updated each time the steps of the method are carried out again.

With reference to [FIG. 4], we will now show an exemplary device structure 110*eq* enabling steps of the equalization method to be carried out (according to one of the aspects described above with reference to [FIG. 2*a*], [FIG. 2*b*] or [FIG. 2*c*]) according to one aspect of the disclosure.

The device 110*eq* comprises a random access memory 403 (for example a RAM memory), a processing unit 402 equipped for example with one (or more) processor(s), and controlled by a computer program stored in a read-only memory 401 (for example a ROM memory or a hard disk). During initialization, the code instructions of the computer program are, for example, loaded into the random access memory 403 before being executed by the processor of the processing unit 402.

This FIG. 4 only shows one specific way, among several possible ways, of implementing the device 110*eq* so that it carries out certain steps of the equalization method (according to one of the aspects and/or variants described above with reference to [FIG. 2*a*], [FIG. 2*b*] or [FIG. 2*c*]. Indeed, these steps can be carried out equally well on a reprogrammable computing machine (a PC computer, one (or more) DSP processor(s) or one (or more) microcontroller(s)) running a program comprising a sequence of instructions, or on a dedicated computing machine (for example a set of logic gates such as one (or more) FPGAs or one (or more) ASICs, or any other hardware module).

If the device 110*eq* is designed at least partly with a reprogrammable computing machine, the corresponding program (i.e. the sequence of instructions) may or may not be stored in a removable storage medium (such as a CD-ROM, a DVD-ROM, a USB stick), this storage medium being partly or totally readable by a computer or processor.

In certain aspects, the broadcasting system 110 comprises the device 110*eq*.

In certain aspects, the device 110*eq* is connected to the broadcasting system 110.

What is claimed is:

1. A method for equalizing an audio frequency signal broadcast in a broadcasting environment by a broadcasting system comprising at least one loudspeaker, the method being characterized in that it comprises:

estimating a frequency profile of a noise signal representing a background noise present in the broadcasting environment, based on a signal, called the captured signal, captured by at least one microphone implemented in the broadcasting environment and on said audio frequency signal;

determining a desired frequency profile for said broadcast audio frequency signal;

determining an acoustic frequency mask representing, for each frequency component, a difference between said frequency profile of said noise signal and said desired frequency profile; and equalizing said audio frequency signal via a weighting of a spectrum of said audio frequency signal by applying a frequency weighting mask that is a function of said acoustic frequency mask, delivering said equalized audio frequency signal;

the method further comprising:

estimating said noise signal; and detecting at least one voice signal present in said noise signal providing detection information, said steps of estimating, determining and equalizing being carried out periodically for various samples of said captured signal and said audio frequency signal, wherein said detection of at least one voice signal involves estimating a likelihood of the presence of at least one voice signal in said noise signal, said frequency equalization implementing, for a given implementation, the frequency weighting mask corresponding to a weighted linear combination of the acoustic frequency mask determined during a previous implementation of said steps and on the acoustic frequency mask determined during the given implementation of said steps, said weighting being a function of said likelihood of presence such that said linear combination is reduced to:

the acoustic frequency mask determined during a previous implementation of said steps when the likelihood of the presence of at least one voice signal in said noise signal is equal to 1; and the acoustic frequency mask determined during the given implementation of said steps when the likelihood of the presence of at least one voice signal in said noise signal is zero.

2. The method according to claim 1, wherein said acoustic frequency mask represents, for each frequency component, said difference when said difference is greater than a predetermined threshold.

3. The method according to claim 1, wherein said frequency weighting mask is obtained by weighting different frequency components of said acoustic frequency mask by applying predetermined weighting values.

4. The method according to claim 1, wherein the values of said frequency weighting mask are limited to a maximum value and a minimum value.

5. The method according to claim 1, wherein said determination of a desired frequency profile involves calculating a desired frequency division of an energy of said audio frequency signal as a function of at least one parameter belonging to the group comprising:

a sound volume for broadcasting said audio frequency signal;

an intensity, variable in frequency, depending on the sound volume;

a predefined frequency equalization;

one or more parameters for configuring said broadcasting system; and when said broadcasting system comprises a plurality of loudspeakers, one or more parameters for distributing said audio frequency signal between said loudspeakers.

6. The method according to claim 1, wherein said estimation of a frequency profile of said noise signal involves correcting a transfer function of said at least one microphone.

7. The method according to claim 1, comprising:

estimating said noise signal; and detecting at least one voice signal present in said noise signal providing detection information, said steps of estimating, determining and equalizing being carried out periodically for various samples of said captured signal and said audio frequency signal, said frequency equalization implementing, for a given implementation:

when said detection information represents an absence of detection of at least one voice signal in said noise signal: the frequency weighting mask corresponding to the acoustic frequency mask determined during the given implementation of said steps; or when said detection information represents the detection of at least one voice signal in said noise signal: the frequency weighting mask corresponding to the acoustic frequency mask determined during a previous implementation of said steps.

8. The method according to claim 7, wherein said estimation of said noise signal involves a method of spectral estimation of background noise, based on said captured signal and on said audio frequency signal, wherein said estimation of said frequency profile of said noise signal comprises:

applying a filter bank to said noise signal providing a plurality of filtered noise signals, envelope detection of each of said filtered noise signals providing a corresponding plurality of filtered noise signal envelopes, low-pass filtering of each of said filtered noise signal envelopes providing a corresponding plurality of components of said frequency profile of said noise signal.

9. The method according to claim 1, wherein said weighted linear combination is expressed as $Pvp(f)=P0(f)+\alpha(p)\cdot(Pm(f)-P0(f))$, where:

$P0(f)$ is the acoustic frequency mask determined during a previous implementation of the steps of estimating, determining and equalizing;

$Pm(f)$ is the acoustic frequency mask determined during the given implementation of the abovementioned steps; and $\alpha(p)=1-p$ is said weighting as a function of said likelihood of presence, with p said likelihood of presence.

10. The method according to claim 1, wherein said frequency equalization implements temporal smoothing of the frequency weighing mask according to the law $Pvp\_m(n,f)=(n)\cdot(Pvp(f)-Pvp\_m(n-1,f))$, where:

$Pvp\_m(n,f)$ is the frequency weighting mask smoothed over time for a frequency f of the signal band to be equalized during the nth implementation of the steps of estimating, determining and equalizing;

$Pvp(f)$ is the frequency weighting mask calculated during the nth implementation of said steps;

$Pvp\_m(n-1,f)$ is the smoothed frequency weighting mask for a frequency f of the signal band to be equalized during the (n−1)th implementation of said steps; and $\beta(n)$ is a weighting factor comprised between 0 and 1.

11. The method according to claim 1, wherein said estimation of said frequency profile of said noise signal comprises:

applying a filter bank to said captured signal providing a plurality of filtered captured signals, for each of said filtered captured signals: implementing a method of spectral estimation of background noise, based on said filtered captured signal and on said audio frequency signal providing a corresponding plurality of filtered noise signals, envelope detection of each of said filtered noise signals providing a corresponding plurality of filtered noise signal envelopes, low-pass filtering of each of said filtered noise signal envelopes providing a corresponding plurality of components of said frequency profile of said noise signal, wherein said estimation of said noise signal involves a summation of each of said filtered noise signals.

12. The method according to claim 1, comprising an averaging of a plurality of signals each captured by a different microphone implemented in the broadcasting environment, said averaging providing said captured signal.

13. A non-transitory computer readable medium comprising program code instructions executable by a processing device for implementing the method according to claim 1.

14. A device for equalizing an audio frequency signal broadcast in a broadcasting environment by a broadcasting system comprising at least one loudspeaker, the device being characterized in that it comprises a reprogrammable computing machine or a dedicated computing machine configured to perform:

estimating a frequency profile of a noise signal representing a background noise present in the broadcasting environment, based on a signal, called the captured signal, captured by at least one microphone implemented in the broadcasting environment and on said audio frequency signal;

determining a desired frequency profile for said broadcast audio frequency signal;

determining an acoustic frequency mask representing, for each frequency component, a difference between said frequency profile of said noise signal and said desired frequency profile; and equalizing said audio frequency signal via a weighting of a spectrum of said audio frequency signal by applying a frequency weighting mask that is a function of said acoustic frequency mask, delivering said equalized audio frequency signal;

the reprogrammable computing machine or the dedicated computing machine being further configured to perform:

estimating said noise signal; and detecting at least one voice signal present in said noise signal providing detection information, said steps of estimating, determining and equalizing being carried out periodically for various samples of said captured signal and said audio frequency signal, wherein said detection of at least one voice signal involves estimating a likelihood of the presence of at least one voice signal in said noise signal, said frequency equalization implementing, for a given implementation, the frequency weighting mask corresponding to a weighted linear combination of the acoustic frequency mask determined during a previous implementation of said steps and on the acoustic frequency mask determined during the given implementation of said steps, said weighting being a function of said likelihood of presence such that said linear combination is reduced to:

the acoustic frequency mask determined during a previous implementation of said steps when the likelihood of the presence of at least one voice signal in said noise signal is equal to 1; and the acoustic frequency mask determined during the given implementation of said steps when the likelihood of the presence of at least one voice signal in said noise signal is zero.

* * * * *